(12) United States Patent
Gerber et al.

(10) Patent No.: US 7,935,775 B2
(45) Date of Patent: *May 3, 2011

(54) MANNICH BASES AND PROCESSES FOR THE PREPARATION OF MANNICH BASES

(75) Inventors: Ulrich Gerber, Uitikon-Waldegg (CH); Thomas Wigger, Aesch bei Birmensdorf (CH)

(73) Assignee: Sika Technology AG, Baar (CH)

( * ) Notice: Subject to any disclaimer, the term of this patent is extended or adjusted under 35 U.S.C. 154(b) by 917 days.

This patent is subject to a terminal disclaimer.

(21) Appl. No.: 10/552,482

(22) PCT Filed: May 4, 2004

(86) PCT No.: PCT/EP2004/050697
§ 371 (c)(1), (2), (4) Date: Dec. 7, 2006

(87) PCT Pub. No.: WO2004/099311
PCT Pub. Date: Nov. 18, 2004

(65) Prior Publication Data
US 2007/0093630 A1    Apr. 26, 2007

(30) Foreign Application Priority Data
May 5, 2003    (EP) .................................. 03010122

(51) Int. Cl.
C08G 18/00    (2006.01)
C08G 65/14    (2006.01)
C08G 8/04    (2006.01)
C08G 65/40    (2006.01)

(52) U.S. Cl. ............. 528/44; 528/87; 528/128; 528/211
(58) Field of Classification Search .................. 525/504; 528/44, 87, 129, 211
See application file for complete search history.

(56) References Cited

U.S. PATENT DOCUMENTS
4,269,742 A      5/1981   Goeke et al.
5,688,876 A  *  11/1997   Ando et al. .................... 525/504
5,688,905 A  *  11/1997   Walker .......................... 528/332

FOREIGN PATENT DOCUMENTS
WO    WO 98/15588 A1    4/1998
WO    WO 00/15687 A1    3/2000

* cited by examiner

Primary Examiner — Timothy J. Kugel
Assistant Examiner — Atnaf Admasu
(74) Attorney, Agent, or Firm — Oliff & Berridge, PLC

(57) ABSTRACT

Disclosed are novel Mannich bases which are produced by using at least one phenolic compound of formula (I):

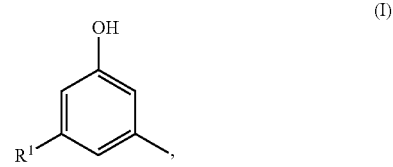

formaldehyde, and at least one polyamine. Also disclosed is a two-step method for producing Mannich bases, by means of which low viscous Mannich bases are obtained.

20 Claims, No Drawings

MANNICH BASES AND PROCESSES FOR THE PREPARATION OF MANNICH BASES

TECHNICAL FIELD

The invention relates to innovative Mannich bases and also to new processes for preparing Mannich bases.

PRIOR ART

Mannich bases have been known for a long time. Phenol as starting material has the great disadvantage that the Mannich bases prepared from it still contain fractions of unreacted phenol. Because of phenol's toxicity, phenol-based Mannich bases cannot be used for numerous market segments. Great efforts have therefore been made to prepare phenol-free Mannich bases. For example, Mannich bases based on nonylphenol or p-tert-butylphenol or cardanol have been developed and commercialized.

Mannich bases are employed principally as accelerants for epoxy resins or as hardeners for epoxy resins and polyurethanes. WO 00/15687, for example, describes a Mannich base accelerant prepared by transaminating a Mannich base with an amine.

One great disadvantage of known Mannich hardeners is the high viscosity that develops as they are prepared, owing to the formation of oligomers and byproducts. Because of this, the Mannich base hardeners are usually employed in a blend of customary polyamines. The admixing of additional polyamines, however, has a usually negative effect on the properties of the cured epoxy resin composition.

SUMMARY OF THE INVENTION

It is an object of the present invention to prepare innovative Mannich bases which can be used as hardeners in two-component epoxy resin compositions and polyurethane compositions and which are free from phenol.

It has been found that Mannich bases as claimed in claim 1 exhibit these properties and hence that the problems of the prior art could be overcome. Additionally, a two-stage preparation process for preparing Mannich bases has been found that leads to lower viscosity on the part of the Mannich bases.

WAY OF PERFORMING THE INVENTION

The present invention relates to innovative Mannich bases prepared using at least one phenolic compound of the formula (I) and also formaldehyde and at least one polyamine.

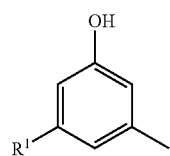
(I)

In the above formula (I) the radical $R^1$ is either H or $CH_3$. A preferred phenolic compound of the formula (I) is m-cresol.

Formaldehyde can be employed in the forms that are common knowledge to the person skilled in the art, directly, or from formaldehyde donor compounds. Preference is given to formaldehyde in the form of para-formaldehyde or in the form of formalin solution. Particular preference is given to formalin solution.

By 'polyamine' is meant a compound having two or more primary amino groups. Polyamines of this kind are known to the person skilled in the art in the field of epoxide and polyurethane chemistry as crosslinking agents. Particular suitability is possessed by the following:

aliphatic polyamines such as
ethylenediamine, 1,2- and 1,3-propanediamine, 2-methyl-1,2-propanediamine, 2,2-dimethyl-1,3-propanediamine, 1,3- and 1,4-butanediamine, 1,3- and 1,5-pentanediamine, 1,5-diamino-2-methylpentane (MPMD), 1,6-hexanediamine, 2,2,4- and 2,4,4-trimethylhexamethylenediamine, 1,7-heptanediamine, 1,8-octanediamine, 4-aminomethyl-1,8-octanediamine, 1,9-nonanediamine, 1,10-decanediamine, 1,11-undecanediamine, 1,12-dodecanediamine, methylbis(3-aminopropyl)amine, 1,3-diaminopentane (DAMP), 2,5-dimethyl-1,6-hexamethylenediamine, diethylenetriamine, triethylenetetramine (3,6-diazaoctamethylenediamine), tetraethylene-pentamine, pentamethylenehexamine, dipropylenetriamine, tripropylene-tetramine, tetrapropylenepentamine, 4,7-diazadecamethylene-1,10-diamine, and mixtures of the aforementioned polyamines.

cycloaliphatic polyamines such as 1,3- and 1,4-diaminocyclohexane, 1,2-diaminocyclohexane (DCH), bis(4-aminocyclohexyl)methane (PACM), bis(4-amino-3-methylcyclohexyl)methane, bis(4-amino-3-ethylcyclohexyl) methane, bis(4-amino-3,5-dimethylcyclohexyl)methane, 1-amino-3-aminomethyl-3,5,5-trimethylcyclohexane (=isophoronediamine or IPDA), 2- and 4-methyl-1,3-diaminocyclohexane, 1,3- and 1,4-bis(amino-methyl) cyclohexane, 1,3-2,5(2,6)-bis(aminomethyl)bicyclo[2.2.1]heptane (NBDA, produced by Mitsui Chemicals), 3(4),8(9)-bis(amino-methyl)tricyclo[5.2.1.0$^{2,6}$]decane, 3,9-bis(3-aminopropyl)-2,4,8,10-tetraoxa-spiro[5.5]undecane, 1,3- and 1,4-xylylenediamine, octahydro-4,7-methano-indene-2,5-diamine, octahydro-4,7-methanoindene-1,6-diamine, aliphatic polyamines containing ether groups, such as bis(2-aminoethyl) ether, 4,7-dioxadecane-1,10-diamine, 4,9-dioxadodecane-1,12-diamine, and higher oligomers thereof, polyoxyalkylene-polyamines having theoretically two or three amino groups, available for example under the name Jeffamine® (produced by Huntsman Chemicals), and mixtures of the aforementioned polyamines.

aromatic amines such as tolylenediamine, phenylenediamine, 4,4-methylenedianiline (MDA), and mixtures of the aforementioned polyamines.

Preference is given to polyamines selected from the group encompassing DAMP, IPDA, 1,3- and 1,4-diaminocyclohexane, 1,2-diamino-cyclohexane, 1,3- and 1,4-butanediamine, 1,3- and 1,5-pentanediamine, MPMD, 1,3-xylylenediamine, 1,3-bis(aminomethyl)cyclohexane, diethylene-triamine, triethylenetetramine (3,6-diazaoctamethylenediamine), tetraethylene-pentamine, pentamethylenehexamine, dipropylenetriamine, tripropylene-tetramine, tetrapropylenepentamine, 4,7-diazadecamethylene-1,10-diamine, bis(4-aminocyclohexyl)methane, bis(4-amino-3-methylcyclohexyl)methane, 3(4),8(9)-bis(aminomethyl)tricyclo[5.2.1.0$^{2,6}$]decane, and mixtures thereof.

With particular preference the polyamines are selected from the group encompassing 1,3-xylylenediamine, 1,3-bis(aminomethyl)cyclohexane, diethylenetriamine, triethylenetetramine (3,6-diazaoctamethylenediamine), tetraethylenepentamine, IPDA, 1,2-diaminocyclohexane, 4,7-diazadecamethylene-1,10-diamine, and mixtures thereof.

It will be appreciated that mixtures of such polyamines with other polyamines or other amines are also possible.

The selection of the polyamines employed greatly influences the properties of the Mannich bases prepared by the process disclosed and also of the epoxy or polyurethane systems cured using them.

Mannich bases can be prepared from phenolic compounds of the formula (I), formaldehyde, and polyamines. It is possible to prepare Mannich bases by customary one-stage processes. With preference, however, the Mannich bases are prepared by the two-stage process described below.

A further aspect of the present invention constitutes a new two-stage process for preparing Mannich bases. The feature of this inventive process for preparing a Mannich base is that in a first stage at least one phenolic compound is reacted with formaldehyde in the presence of a tertiary amine and in a subsequent stage reaction is carried out with at least one polyamine.

Particularly suitable phenolic compounds are those which contain unsubstituted positions at position o and/or p with respect to the phenol group. Examples thereof are hydroxynaphthalenes, polyhydroxynaphthalenes, alkyl-phenols, dialkylphenols, bridged phenols, such as tetrahydronaphthols, for example. Polyphenolic compounds as well, both mononuclear and polynuclear, are also encompassed. Examples of polyphenolic compounds of this kind are pyrocatechol, resorcinol, pyrogallol, phloroglucinol, bisphenol A, and bisphenol F.

Particularly suitable phenolic compounds are those which have unsubstituted positions at positions o and p with respect to the phenol group.

Preference is given to a phenolic compound of the formula (I)

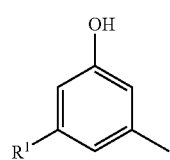

with $R^1$ in this case being H or $CH_3$.

Considered as particularly preferable is m-cresol, wherein formula (I) $R^1$ is a hydrogen atom.

Formaldehyde can be employed in the forms that are common knowledge to the person skilled in the art, directly, or from formaldehyde donor compounds. Preference is given to formaldehyde in the form of para-formaldehyde or in the form of formalin solution. Particular preference is given to formalin solution.

Particularly suitable tertiary amines are those which additionally contain primary amino groups as well, such as 1-(2-aminoethyl)piperazine, for example. Preference is given to tertiary amines of the formula (II) in which the radicals $R^2$ are a $C_1$-$C_6$ alkyl and n=1, 2 or 3:

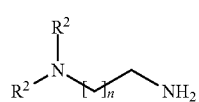

Considered preferable as $R^2$ is $R^2$=methyl or ethyl, particularly $R^2$=methyl. As preferable for n is n=2.

It is also possible to use mixtures of tertiary amines. In certain circumstances it is also possible as well to make use, additionally, of alkali metal hydroxides, alkaline earth metal hydroxides or mixtures thereof in the first stage.

Advantageously, in the first stage, the formaldehyde is added to a mixture of the phenolic component and the tertiary amine. The addition is advantageously made such that, with cooling, the formaldehyde, which is likewise cooled, is added slowly, dropwise for example, with stirring, such that only a slight temperature rise is observed. Care should be taken to ensure that the temperature does not exceed 45° to 50° C. Following the end of the addition it is advantageous to maintain the temperature at approximately 45° C. for around one hour. Furthermore, working under inert gas is recommended.

In a second stage a reaction is carried out with at least one polyamine. Advantageously, in the second stage, slowly, dropwise for example, the product resulting from the first stage is added to the polyamine stage with stirring. In this case the polyamine should be heated to a temperature of approximately 80° C. Following the addition, advantageously under nitrogen, heating takes place to a temperature of approximately 110° C. At the same time the water of reaction is removed by distillation. The water which has still not been expelled is preferably distilled off by application of vacuum.

The Mannich base can be used immediately, preferably after cooling to room temperature, as a hardener or can be blended. The Mannich base is storage-stable and shows no substantial change in its properties in the course of storage.

The selection of the polyamines used strongly influences the properties of the Mannich bases prepared by the process disclosed and also of the epoxy or polyurethane systems cured using them. In principle, all polyamines known to the person skilled in the art in the field of epoxy and polyurethane chemistry as crosslinking agents are suitable as polyamine for use in the process of the invention.

Particularly suitable polyamines are:

aliphatic polyamines such as ethylenediamine, 1,2- and 1,3-propanediamine, 2-methyl-1,2-propanediamine, 2,2-dimethyl-1,3-propanediamine, 1,3- and 1,4-butanediamine, 1,3- and 1,5-pentanediamine, 1,5-diamino-2-methylpentane (MPMD), 1,6-hexanediamine, 2,2,4- and 2,4,4-trimethylhexamethylenediamine, 1,7-heptanediamine, 1,8-octanediamine, 4-aminomethyl-1,8-octanediamine, 1,9-nonanediamine, 1,10-decanediamine, 1,11-undecanediamine, 1,12-dodecanediamine, methylbis(3-aminopropyl)amine, 1,3-diaminopentane (DAMP), 2,5-dimethyl-1,6-hexamethylenediamine, diethylenetriamine, triethylenetetramine (3,6-diazaoctamethylenediamine), tetraethylene-pentamine, pentamethylenehexamine, dipropylenetriamine, tripropylene-tetramine, tetrapropylenepentamine, 4,7-diazadecamethylene-1,10-diamine, and mixtures of the aforementioned polyamines.

cycloaliphatic polyamines such as 1,3- and 1,4-diaminocyclohexane, 1,2-diaminocyclohexane (DCH), bis(4-aminocyclohexyl)methane (PACM), bis(4-amino-3-methylcyclohexyl)methane, bis(4-amino-3-ethylcyclohexyl)methane, bis(4-amino-3,5-dimethylcyclohexyl)methane, 1-amino-3-aminomethyl-3,5,5-trimethylcyclohexane (=isophoronediamine or IPDA), 2- and 4-methyl-1,3-diaminocyclohexane, 1,3- and 1,4-bis(amino-methyl)cyclohexane, 1,3-2,5(2,6)-bis(aminomethyl)bicyclo[2.2.1]heptane (NBDA, produced by Mitsui Chemicals), 3(4),8(9)-bis(amino-methyl)tricyclo[5.2.1.0$^{2,6}$]decane, 3,9-bis(3-aminopropyl)-2,4,8,10-tetraoxa-spiro[5.5]undecane, 1,3- and 1,4-xylylenediamine, octahydro-4,7-methano-indene-2,5-diamine, octahydro-4,7-methanoindene-1,6-diamine, aliphatic polyamines containing ether groups, such as bis(2-aminoethyl) ether, 4,7-dioxadecane-1,10-diamine, 4,9-dioxadodecane-1,12-diamine, and higher oligomers thereof, polyoxyalkylene-polyamines having theoretically two or three amino groups, available for example under the name Jeffamine® (produced by Huntsman Chemicals), and mixtures of the aforementioned polyamines.

aromatic amines such as tolylenediamine, phenylenediamine, 4,4-methylenedianiline (MDA), and mixtures of the aforementioned polyamines.

Preference is given to polyamines selected from the group encompassing DAMP, IPDA, 1,3- and 1,4-diaminocyclohexane, 1,2-diamino-cyclohexane, 1,3- and 1,4-butanediamine, 1,3- and 1,5-pentanediamine, MPMD, 1,3-xylylenediamine, 1,3-bis(aminomethyl)cyclohexane, diethylene-triamine, triethylenetetramine (3,6-diazaoctamethylenediamine), tetraethylene-pentamine, pentamethylenehexamine, dipropylenetriamine, tripropylene-tetramine, tetrapropylenepentamine, 4,7-diazadecamethylene-1,10-diamine, bis(4-aminocyclohexyl)methane, bis(4-amino-3-methylcyclohexyl)methane, 3(4),8(9)-bis(aminomethyl)tricyclo[5.2.1.0$^{2,6}$]decane, and mixtures thereof.

With particular preference the polyamines are selected from the group encompassing 1,3-xylylenediamine, 1,3-bis(aminomethyl)cyclohexane, diethylenetriamine, triethylenetetramine (3,6-diazaoctamethylenediamine), tetraethylenepentamine, IPDA, 1,2-diaminocyclohexane, 4,7-diazadecamethylene-1,10-diamine, and mixtures thereof.

It will be appreciated that mixtures of such polyamines with other polyamines or other amines are also possible.

Mannich bases prepared by means of the process of the invention have very low viscosities. The ratio $k(\eta_1/\eta_2)$ between the viscosity of the Mannich base prepared by a one-stage process ($\eta_1$) to the viscosity of the Mannich base prepared by the inventive two-stage process ($\eta_2$) is greater than 1, preferably greater than 2.5, in particular greater than 3.

The one-stage process relevant for determining $\eta_2$ is distinguished by the addition of formaldehyde to a mixture of polyamine and phenolic compound.

The viscosity obtained for the Mannich base prepared by the inventive process depends heavily on the phenolic compound employed and also on the polyamine employed.

Particularly suitable Mannich bases have a viscosity at 25° C. of less than 1000 mPas. Preferred Mannich bases have viscosities in the range between 200 and 700 mPas.

To the person skilled in the art it is clear that with this kind of reaction it is also possible for unreacted constituents to be present to a small extent in the end product.

The Mannich bases prepared by the inventive process have not only secondary but also primary amino groups.

In addition it has been possible to find that, in accordance with this process, Mannich bases can be prepared which contain no polynuclear oligomers or, at least, a low fraction of polynuclear oligomers. The oligomer fraction is preferably less than 20% by weight, in particular less than 10% by weight, based on the weight of the Mannich base.

With this process it is likewise possible to prepare Mannich bases which contain a very low fraction of unreacted phenolic compounds. It is advantageous if the Mannich base contains less than 1% by weight, in particular less than 0.5% by weight, preferably less than 0.1% by weight, of unreacted phenolic compound, based on the weight of the Mannich base.

The Mannich bases of the invention and also the Mannich bases resulting from the inventive process find use, for example, as hardeners in the hardener component of two-component epoxy or polyurethane systems. The Mannich bases can be used here directly or as constituents of the hardener component.

With particular preference the Mannich bases are used as hardeners in two-component epoxy resin systems, particularly in two-component epoxy resin adhesives.

The two-component epoxy or polyurethane systems cured using these Mannich bases, and the products obtained from them, have very advantageous properties.

EXAMPLES

The examples below serve to illustrate the invention.

Example of a Two-stage Mannich Base Preparation

Preparation 1st Stage

The phenolic compound was charged to a glass flask and tertiary amine was added. The mixture was cooled to 20° C. and then, slowly and with cooling, cold formalin solution (36.5% by weight in water) was added dropwise. A marked exotherm occurred. The internal temperature was maintained at between 40° C. and 45° C. After the end of the addition, stirring was continued at 40-45° C. for one hour.

Preparation 2nd Stage

The polyamine indicated in table 1 was charged to the reactor under nitrogen at RT and heated to 80° C., and the intermediate resulting from the first stage was poured in slowly with stirring. A mild exotherm occurred. Under nitrogen, heating took place to approximately 110° C. and at the same time the water of reaction was distilled off under atmospheric pressure. After 80% of the theoretical amount of water of reaction, vacuum was applied and distillative removal took place up to the theoretical amount of water.

Example of a One-stage Mannich Base Preparation

The polyamine indicated in table 1, any tertiary amine present, and the phenolic compound were charged to a vessel. With cooling, at a temperature of 20 to 30° C., a cold formalin solution (36.5% by weight in water) was added dropwise. A considerable exotherm occurred. Under nitrogen, heating took place to approximately 110° C. and at the same time the water of reaction was distilled off under atmospheric pressure. After 80% of the theoretical amount of water of reaction, vacuum was applied and distillative removal was carried out up to the theoretical amount of water.

TABLE 1

Examples of Mannich bases.

| | Mannich base: | | | | | | | | | | | | | |
|---|---|---|---|---|---|---|---|---|---|---|---|---|---|---|
| | E1 | E2 | E3 | E4 | E5 | E6 | E7 | E8 | E9 | E10 | E11 | E12 | E13 | E14 |
| Phenolic compound | | | | | | | | | | | | | | |
| m-Cresol (g) | 108 | 108 | 108 | 108 | 108 | 108 | 108 | 24 | 24 | 24 | 24 | 24 | | |
| 3,5-Xylenol (g) | | | | | | | | | | | | | 122 | 122 |
| Tertiary amine | | | | | | | | | | | | | | |
| Dimethylaminopropylamine (g) | 102 | 102 | 102 | 102 | 102 | 102 | 102 | 22 | 22 | 22 | 22 | 22 | | |
| 1-(2-Aminoethyl)piperazine (g) | | | | | | | | | | | | | 129 | 129 |
| Formalin (36.5% aq.) (g) | 198 | 198 | 198 | 198 | 198 | 198 | 198 | 54 | 54 | 54 | 54 | 54 | 198 | 198 |
| Polyamine | | | | | | | | | | | | | | |
| MXDA (g) | 408 | | | | | | | | 119 | | | | | |
| TMD (g) | | 475 | | | | | | | | 139 | | | | |
| IPD (g) | | | 511 | | | | | | | | | | | |
| DCH (g) | | | | 342 | | | | | | | 100 | 55 | 342 | 342 |
| PACM (g) | | | | | 618 | | | | | | | | | |
| Laromin C 260 (g) | | | | | | 714 | | | | | | | | |
| DETA (g) | | | | | | | | 309 | | | | 90 | | |
| Number of stages | 2 | 2 | 2 | 2 | 2 | 2 | 2 | 2 | 2 | 2 | 2 | 2 | 1 | 2 |
| Viscosity (mPas)* | 772 | 291 | 3272 | 466 | 18810 | 14180 | 368 | 571 | 296 | 501 | 358 | 288 | 2036 | 497 |

*measured as a blend with 5% by weight of accelerant, tris(2,4,6-dimethylamino-methyl)phenol (Araldite HY-960, Vantico).

Example of the Use of a Mannich Base with Epoxy Resins

Different Mannich bases were mixed manually, where appropriate in combination with additional polyamines, as hardener, with an epoxy resin component consisting of 85% of bisphenol A diglydiyl ether (available commercially from Vantico as Araldite GY-250) and 15% of trimethylolpropane triglycidyl ether at 20 to 23° C. and 50% relative atmospheric humidity, and this mixture was cured for 7 days under these conditions.

The tensile strength, the elasticity modulus, and the breaking elongation were determined on test specimens which had been cured at 23° C. and 50% relative atmospheric humidity for 7 days, the determination taking place in accordance with ISO 527 at a tension speed of 5 mm/min.

The pot life of a 100 g mixture in an insulated cylindrical beaker at 23° C. was determined using a gel timer.

TABLE 2

Use of Mannich base in epoxy resin compositions

| Hardener compositions | H1 (g) | H2 (g) | H3 (g) | H4 (g) |
|---|---|---|---|---|
| E2 (g) | 95 | | | |
| E7 | | 95 | | |
| E10 | | | | 47.5 |
| E12 | | | 47.5 | |
| DCH | | | 47.5 | |
| DETA | | | | 47.5 |
| Tris(2,4,6-dimethylaminomethyl)phenol | 5 | 5 | 5 | 5 |
| Viscosity (mPas) | 291 | 368 | 30 | 30 |
| Results after curing with resin component | | | | |
| Tensile strength (MPa) | 18 | 31 | 10 | 41 |
| Elasticity modulus (MPa) | 3567 | 3581 | 3830 | 4012 |
| Breaking elongation (%) | 0.48 | 0.88 | 0.25 | 1.05 |
| Pot life at 25° C. (min) | 40 | 20 | 55 | 27 |

The results from table 2 show that the Mannich bases are suitable as hardeners for epoxy resins.

The invention claimed is:

1. A Mannich base prepared using at least one phenolic compound of the formula (I)

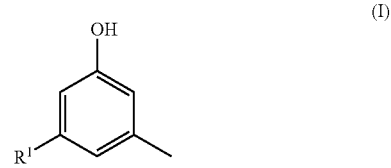

(I)

with $R^1$=H or $CH_3$ and a formaldehyde and at least one polyamine, wherein the Mannich base is prepared by:
reacting the phenolic compound with the formaldehyde in the presence of a tertiary amine; and
reacting a resulting product with the at least one polyamine to obtain the Mannich base, the Mannich base having primary amino groups.

2. The Mannich base as claimed in claim 1, wherein the tertiary amine has the formula (II)

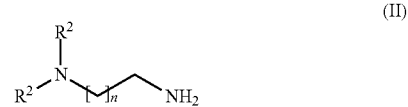

(II)

with $R^2$=$C_1$-$C_6$ alkyl and n=1, 2, or 3.

3. The Mannich base as claimed in claim 2, wherein $R^2$=$CH_3$ in formula (II).

4. The Mannich base as claimed in claim 2, wherein n=2 in formula (II).

5. The Mannich base as claimed in claim 1, wherein the formaldehyde is added to a mixture of the phenolic compound of formula (I) and the tertiary amine.

6. The Mannich base as claimed in claim 1, wherein $R^1$=H in formula (I).

7. The Mannich base as claimed in claim 1, wherein the viscosity at 25° C. is less than 1000 mPas.

8. A hardener component for two-component epoxy systems or polyurethane systems, wherein the hardener component comprises a Mannich base as claimed in claim 1.

9. An epoxy system or polyurethane system comprising at least one Mannich base as claimed in claim 1.

10. The Mannich base as claimed in claim 1, wherein the viscosity at 25° C. is in the range between 200 and 700 mPas.

11. The Mannich base as claimed in claim 1, wherein the phenolic compound is 3,5-xylenol.

12. A process for preparing a Mannich base, comprising:
reacting at least one phenolic compound with formaldehyde in the presence of a tertiary amine; and
reacting a resulting product with at least one polyamine to obtain the Mannich base, the Mannich base having primary amino groups.

13. The process for preparing a Mannich base as claimed in claim 12, wherein the formaldehyde is added to a mixture of the phenolic compound and the tertiary amine.

14. A process for preparing a Mannich base as claimed in claim 12, wherein the tertiary amine has the formula (II)

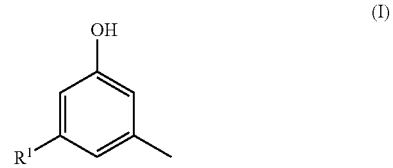

with $R^2$=$C_1$-$C_6$ alkyl and n=1, 2, or 3.

15. The process for preparing a Mannich base as claimed in claim 14, wherein $R^2$=$CH_3$ in formula (II).

16. The process for preparing a Mannich base as claimed in claim 14, wherein n=2 in formula (II).

17. The process for preparing a Mannich base as claimed in claim 12, wherein the phenolic compound is a phenolic compound of the formula (I)

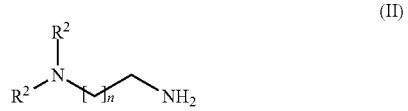

with $R^1$=H or $CH_3$.

18. The process for preparing a Mannich base as claimed in claim 17, wherein $R^1$=H in formula (I).

19. An epoxy system or polyurethane system comprising at least one Mannich base and obtained by a process as claimed in claim 12.

20. A cured product obtained from an epoxy system or polyurethane system as claimed in claim 19.

* * * * *